(12) United States Patent
Lee

(10) Patent No.: US 9,145,919 B2
(45) Date of Patent: Sep. 29, 2015

(54) SPEED-REDUCTION TRANSMISSION BEARING

(71) Applicant: Mao-Tu Lee, New Taipei (TW)

(72) Inventor: Mao-Tu Lee, New Taipei (TW)

(*) Notice: Subject to any disclaimer, the term of this patent is extended or adjusted under 35 U.S.C. 154(b) by 121 days.

(21) Appl. No.: 13/967,175

(22) Filed: Aug. 14, 2013

(65) Prior Publication Data

US 2015/0049975 A1 Feb. 19, 2015

(51) Int. Cl.
*F16H 33/10* (2006.01)
*F16C 33/58* (2006.01)
*F16C 19/24* (2006.01)

(52) U.S. Cl.
CPC .................. *F16C 33/58* (2013.01); *F16C 19/24* (2013.01)

(58) Field of Classification Search
USPC ........................................................... 74/640
See application file for complete search history.

(56) References Cited

U.S. PATENT DOCUMENTS

| 3,469,463 | A | * | 9/1969 | Ishikawa | 74/640 |
| 4,425,822 | A | * | 1/1984 | Marschner et al. | 74/640 |
| 4,577,127 | A | * | 3/1986 | Ferree et al. | 310/83 |
| 4,624,621 | A | * | 11/1986 | Murakami et al. | 414/735 |
| 4,625,582 | A | | 12/1986 | Kiryu | |
| 4,909,098 | A | | 3/1990 | Kiryu | |
| 5,662,008 | A | | 9/1997 | Aubin et al. | |
| 5,860,331 | A | * | 1/1999 | Hashimoto et al. | 74/640 |
| 6,269,711 | B1 | * | 8/2001 | Tejima | 74/640 |
| 7,552,664 | B2 | | 6/2009 | Bulatowicz | |
| 2005/0014595 | A1 | * | 1/2005 | Minegishi | 475/165 |
| 2008/0110287 | A1 | * | 5/2008 | Schonlau | 74/457 |
| 2013/0081587 | A1 | | 4/2013 | David et al. | |
| 2014/0150586 | A1 | * | 6/2014 | Kanai | 74/413 |

FOREIGN PATENT DOCUMENTS

EP 0514829 11/1992

* cited by examiner

*Primary Examiner* — Ha D Ho
(74) *Attorney, Agent, or Firm* — Pai Patent & Trademark Law Firm; Chao-Chang David Pai

(57) ABSTRACT

A speed-reduction transmission bearing includes a first outer race and a second outer race, each having a different number of inner teeth and outer teeth and being attached to each other, rolling elements set between the first and second outer races to prevent separation between the first and second outer races in axial or radial direction, an inner race rotatably mounted within the first and second outer races, and a wave generator rotatable to push the inner race, forcing the outer teeth of the inner race to partially mesh with the inner teeth of the first and second outer race. Thus, by means of rotation of a tooth number difference, the invention achieves high reduction ratio transmission.

10 Claims, 11 Drawing Sheets

SPEED-REDUCTION TRANSMISSION BEARING

BACKGROUND OF THE INVENTION (a) Field of the Invention

The present invention relates to transmission technology, and more particularly to a speed-reduction transmission bearing, which steadily supports the transmission mechanism and achieves high reduction ratio transmission.

(b) Description of the Prior Art

An axle bearing is used to support a motor shaft in axial direction as well as radial direction, maintaining the motor shaft in a centralized position during rotation, enhancing the slidability of the motor shaft and reducing its friction. However, a regular axle bearing does not provide other functions. To enable an axle bearing to be used in a speed reduction transmission mechanism, for example, for a motor to rotate a transmission shaft in a speed-reduction manner, the aforesaid conventional axle bearing cannot achieve a speed reduction function. In this case, a speed-change mechanism (for example, speed-change gearbox) has to be used and coupled between the motor and the transmission shaft for reducing the speed of the rotary power of the motor shaft of the motor by means of multiple gears and then transferring the speed-changed rotary power to the transmission shaft. The installation of the speed-change mechanism greatly increases the size, making the system impractical for use in a precision machine (such as robotic arm) or any other tools with a small installation space.

Further, harmonic drives have been used in industrial motion control, machine tool, robotics and many other fields for gear reduction. Exemplars are seen in U.S. Pat. Nos. 4,625,582, 5,662,008, 7,552,664, 4,909,098, EP0514829, etc. A harmonic drive apparatus includes a circular spline having a number of internal teeth, a radially flexible cylindrical flexspline having outer spline teeth engageable with the internal teeth of the circular spline, and a wave generator disposed within the flexspline in engagement with the flexspline. The circular spline, the flexspline, and the wave generator are rotatable around a rotational axis. The number of the external spline teeth of the flexspline is smaller than the number of the internal spline teeth of the circular spline. The wave generator has a cam section which generates a circumferential wave of radial deflection of the flexspline for causing the external spline teeth thereof to locally engage with the internal spline teeth of the circular spline. The cam section has elasticity in its radial direction sufficient for biasing the flexspline against the circular spline to absorb any play between the flexspline and the circular spline. According to this prior art design, the fabrication of the radially flexible cylindrical flexspline is complicated. Further, radial deflection of the flexspline cannot assure fully engagement between the external spline teeth and the internal spline teeth. Further, the harmonic drive apparatus has a large length in the axial direction, limiting its application to precision machines.

Further, US Pub. 20130081587 discloses a harmonic gear drive, which includes a circular spline and a dynamic spline, a flexspline disposed within the circular spline and the dynamic spline, a wave generator assembly disposed within the flexspline, and a rotational actuator connectable to the wave generator. The wave generator assembly includes an elliptical wave generator surrounded tightly with an inner race having an inner race axial end, an outer race surrounded tightly with the flexspline, a plurality of balls disposed between the inner race and the outer race, and a ball cage having an annular section disposed axial from the balls proximal to the inner race axial end and a plurality of ball separators extending axially from the annular section such that consecutive balls are separated by one of the ball separators. According to this design, the circular spline and the dynamic spline are arranged in a parallel manner and can be forced to move apart in axial direction. To prevent relative displacement between the circular spline and the dynamic spline, a housing is needed to house the circular spline and the dynamic spline. However, the use of the housing greatly increases the dimension of the system and its manufacturing cost.

Therefore, how to combine a speed-reduction mechanism and an axle bearing into a compact and simple speed-reduction transmission bearing for use in a precision machine (such as robotic arm) to provide support and to achieve speed-reduction transmission is the focus of the technical features of the present invention.

SUMMARY OF THE INVENTION

The present invention has been accomplished under the circumstances in view. It is one object of the present invention to provide a speed-reduction transmission bearing, which keeps inner teeth of two coupled outer races in mesh with outer teeth of an inner race and uses a wave generator to drive the inner race, achieving small size and compact structure characteristics and providing speed reduction and axle bearing functions.

To achieve this and other objects of the present invention, a speed-reduction transmission bearing comprises a first outer race, a second outer race, a plurality of first rolling elements, an inner race and a wave generator. The first outer race comprises a first outer race wall, a first inner race wall, a second inner race wall, a first annular roller groove extending around the first inner race wall, and a plurality of first inner teeth located at the second inner race wall. Further, the diameter of the first inner race wall is larger than the diameter of the second inner race wall. The second outer race is rotatably mounted within the first inner race wall of the first outer race, comprising a second outer race wall, a third inner race wall, a second annular roller groove located at the second outer race wall, and a plurality of second inner teeth located at the third inner race wall. There is difference in tooth number between the second inner teeth and the first inner teeth. The first rolling elements are arranged between the first annular roller groove of the first outer race and the second annular roller groove of the second outer race. The inner race is rotatably mounted within the first outer race and the second outer race, comprising a third outer race wall, a fourth inner race wall and a plurality of outer teeth located at the third outer race wall. The wave generator is rotatably mounted within the inner race and supported on the fourth inner race wall of the inner race to force the outer teeth at at least one segment of the inner race into engagement with the first inner teeth and the second inner teeth.

The design of the speed-reduction transmission bearing enables power to be transferred to the cam of the wave generator. During rotation of the cam of the wave generator, the second or third rolling elements are rotating against the fourth inner race wall of the inner race, forcing the outer teeth of the inner race into engagement with the first inner teeth and the second inner teeth. Subject to the difference in tooth number between the first inner teeth and the second inner teeth, the second outer race can be driven by the inner race to make speed-reduction rotation after fixation of the first outer race, achieving speed-reduction transmission and providing an axle bearing function. More particularly, the first outer race and the second outer race are coupled together and the first rolling elements can secure the first outer race and the second outer race together, minimizing the axial width of the speed-reduction transmission bearing the friction produced during relative rotation between the first outer race and second outer race, enhancing the structural stability and preventing separation between the first outer race and the second outer race in axial direction. Thus, the invention has the characteristics of small size and compact structure without needing any additional outer shell.

DETAILED DESCRIPTION OF THE PREFERRED EMBODIMENTS

Figure 1:
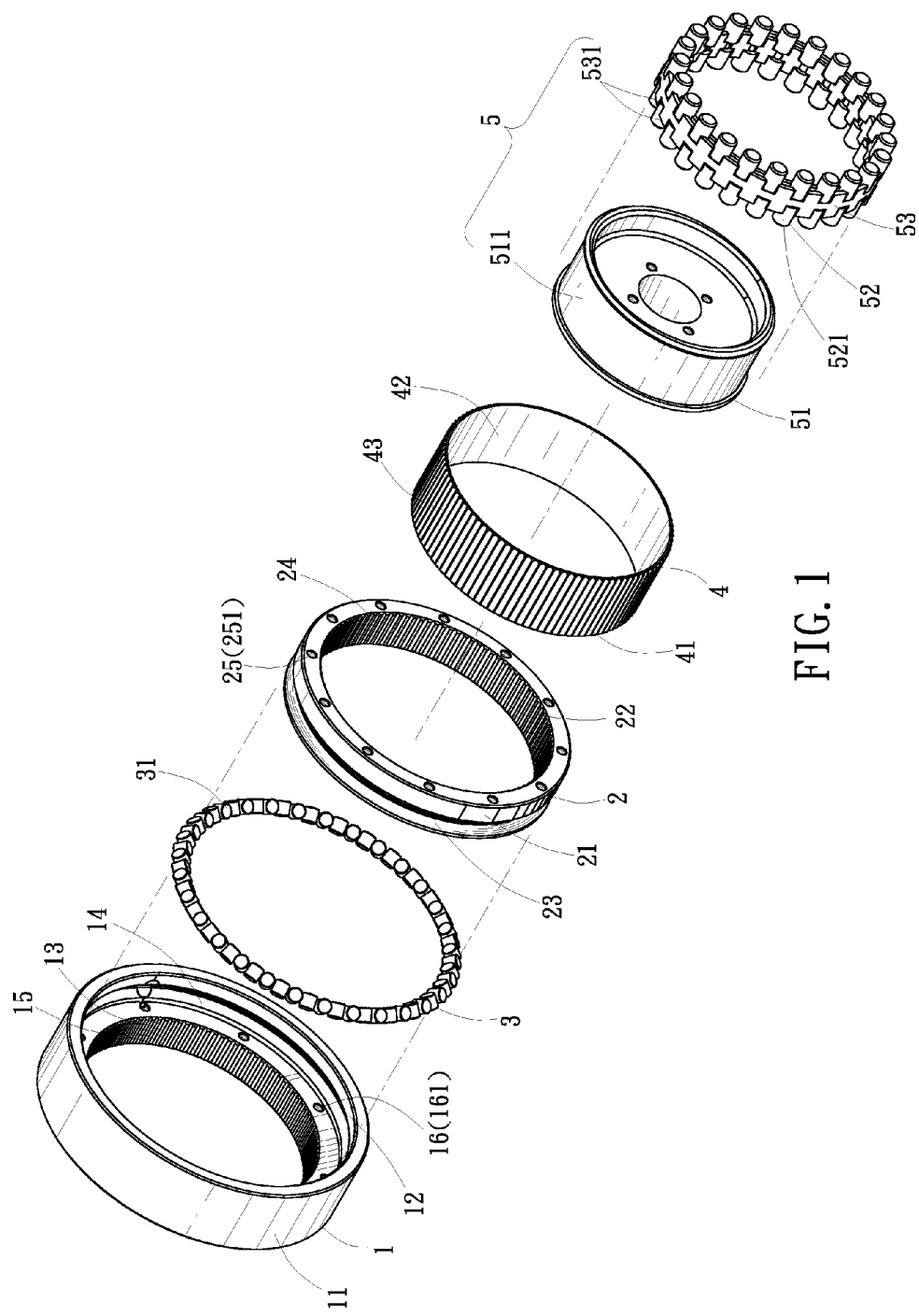
FIG. 1 is an exploded view of a speed-reduction transmission bearing in accordance with a first embodiment of the present invention.
Figure 2:
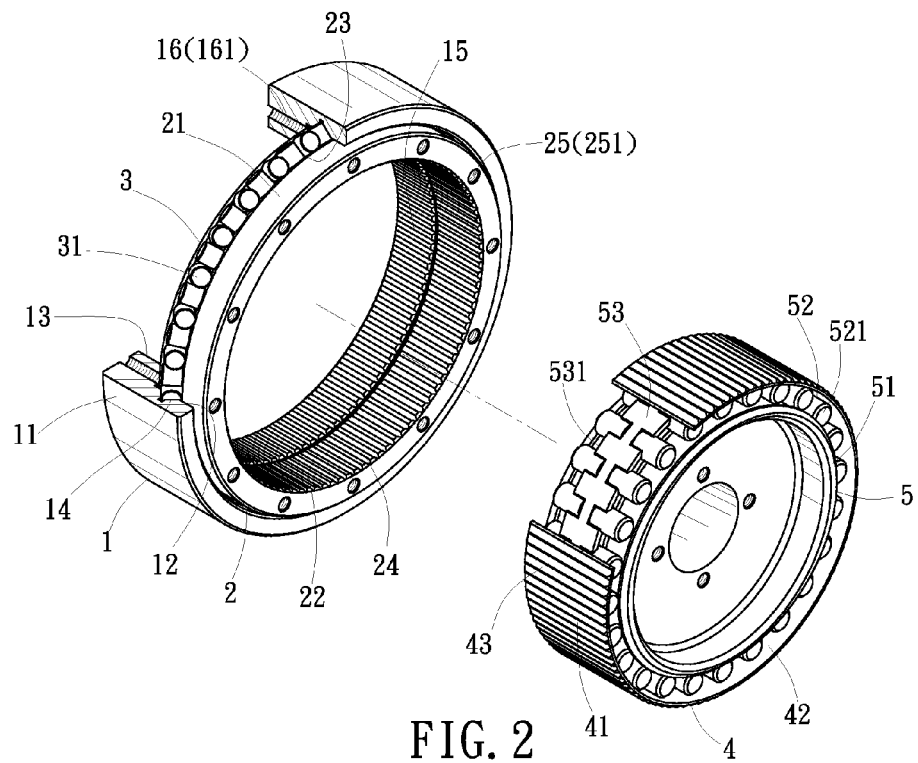
FIG. 2 is an exploded, sectional view of the speed-reduction transmission bearing in accordance with the first embodiment of the present invention.
Figure 3:
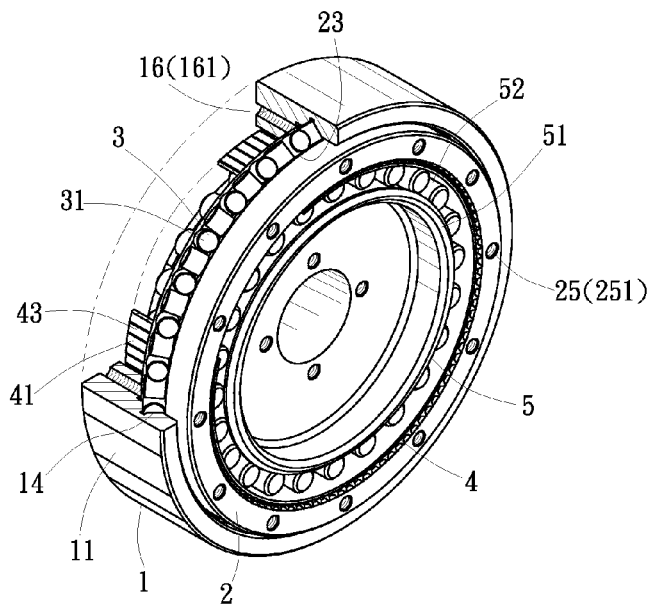
FIG. 3 is a sectional assembly view of the speed-reduction transmission bearing in accordance with the first embodiment of the present invention.

Referring to FIGS. 1, 2 and 3, a speed-reduction transmission bearing in accordance with a first embodiment of the present invention is shown. The speed-reduction transmission bearing of this first embodiment comprises a first outer race 1, a second outer race 2, a plurality of rolling elements 3, an inner race 4, and a wave generator 5.

The first outer race 1 is an annular member defining a first outer race wall 11 disposed at an outer side thereof, a first inner race wall 12 and a second inner race wall 13 disposed at an inner side thereof opposite to the first outer race wall 11. The diameter of the first inner race wall 12 is larger than the diameter of the second inner race wall 13 so that a stepped inside wall is defined within the first outer race 1. The first outer race 1 further comprises a first annular roller groove 14 located at the first inner race wall 12, a plurality of first inner teeth 15 located at the second inner race wall 13, and connection means 16, for example, screw holes 161 equiangularly spaced around an end edge of the second inner race wall 13 for connection to an external transmission shaft or other device.

The second outer race 2 is an annular member rotatably mounted within the first inner race wall 12 of the first outer race 1 (see FIGS. 3 and 4) to minimize the axial width of the speed-reduction transmission bearing. The second outer race 2 comprises a second outer race wall 21 disposed at an outer side thereof, a third inner race wall 22 disposed at an inner side thereof opposite to the second outer race wall 21, a second annular roller groove 23 located at the second outer race wall 21, a plurality of second inner teeth 24 located at the third inner race wall 22, and connection means 25, for example, screw holes 251 equiangularly spaced around one end edge of the third inner race wall 22 for connection to an external transmission shaft or other device. Further, there is a difference between the tooth number of the second inner teeth 24 and the tooth number of the first inner teeth 15. For example, in this embodiment, the number of the second inner teeth 24 is 60, the number of the first inner teeth 15 is 62, and the tooth number difference between the second inner teeth 24 and the first inner teeth 15 is 2. This tooth number difference can be changed during fabrication according to the speed reduction ration required.

The first rolling elements 3 are arranged between the first annular roller groove 14 and the second annular roller groove 23 (see FIG. 4) to work as connection and position-limiting means between the first outer race 1 and the second outer race 2, preventing the first outer race 1 and the second outer race 2 from axial displacement relative to each other and reducing friction therebetween during rotation.

The inner race 4 is an elastically deformable metal ring rotatably mounted within the first outer race 1 and the second outer race 2 (see FIGS. 3 and 4), having a width approximately equal to the combined width of the first inner teeth 15 and the second inner teeth 24. The inner race 4 comprises a third outer race wall 41, a fourth inner race wall 42 opposite to the third outer race wall 41, and a plurality of outer teeth 43 located at the third outer race wall 41. The number of the outer teeth 43 is equal to the number of the second inner teeth 24 in this first embodiment.

Figure 4:
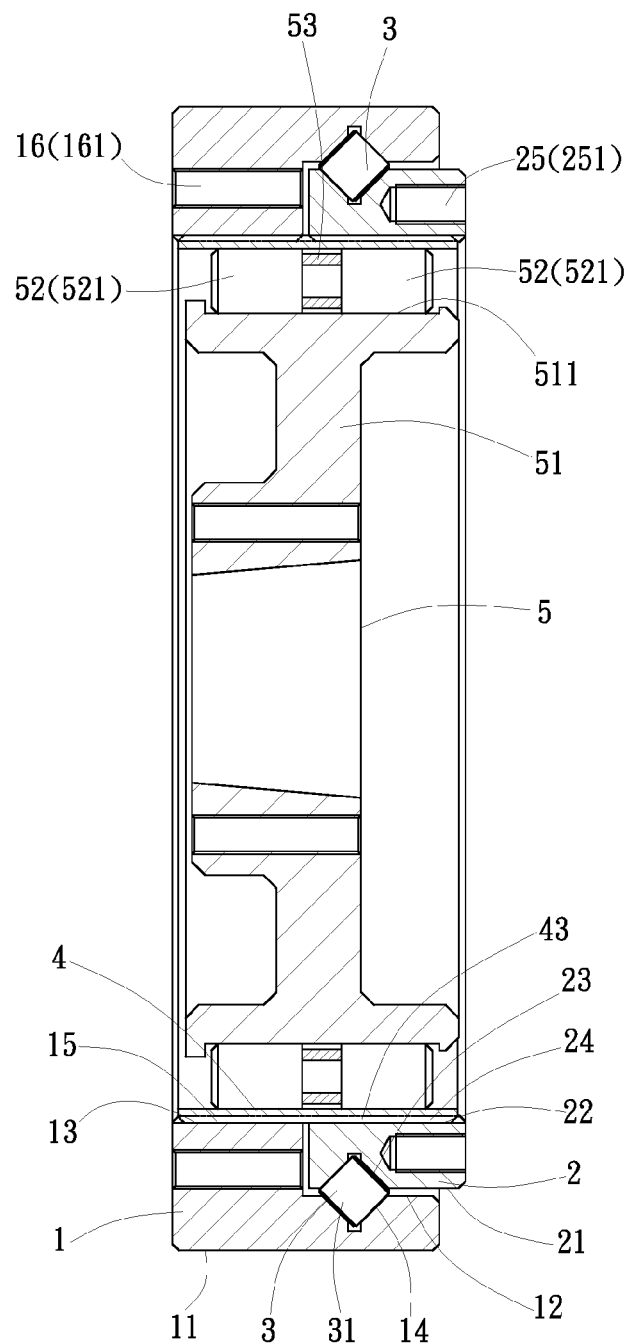
FIG. 4 is a sectional side view of the speed-reduction transmission bearing in accordance with the first embodiment of the present invention.

The wave generator 5 is rotatably mounted within the inner race 4 (see FIG. 4). In this first embodiment, the wave generator 5 is supported inside the fourth inner race wall 42 of the inner race 4 to force the outer teeth 43 at two opposing segments 44 of the inner race 4 into engagement with the first inner teeth 15 and the second inner teeth 24 (see FIG. 5). Thus, during continuous rotation of the wave generator 5, the revolving speed of the second outer race 2 is relatively reduced.

Referring to FIGS. 1 and 4 again, the first rolling elements 3 can be needle rollers 31 or rolling balls. If needle rollers 31 are used for the first rolling elements 3, the first annular roller groove 14 and the second annular roller groove 23 must be configured to provide a V-shaped cross section. In this case, the needle rollers 31 are arranged between the first annular roller groove 14 and the second annular roller groove 23 in a 90° staggered manner (see FIG. 3), therefore preventing relative axial displacement between the first outer race 1 and the second outer race 2, enhancing coupling stability between the first outer race 1 and the second outer race 2, providing support in both radial and axial directions, and reducing friction between the first outer race 1 and the second outer race 2.

Figure 5:
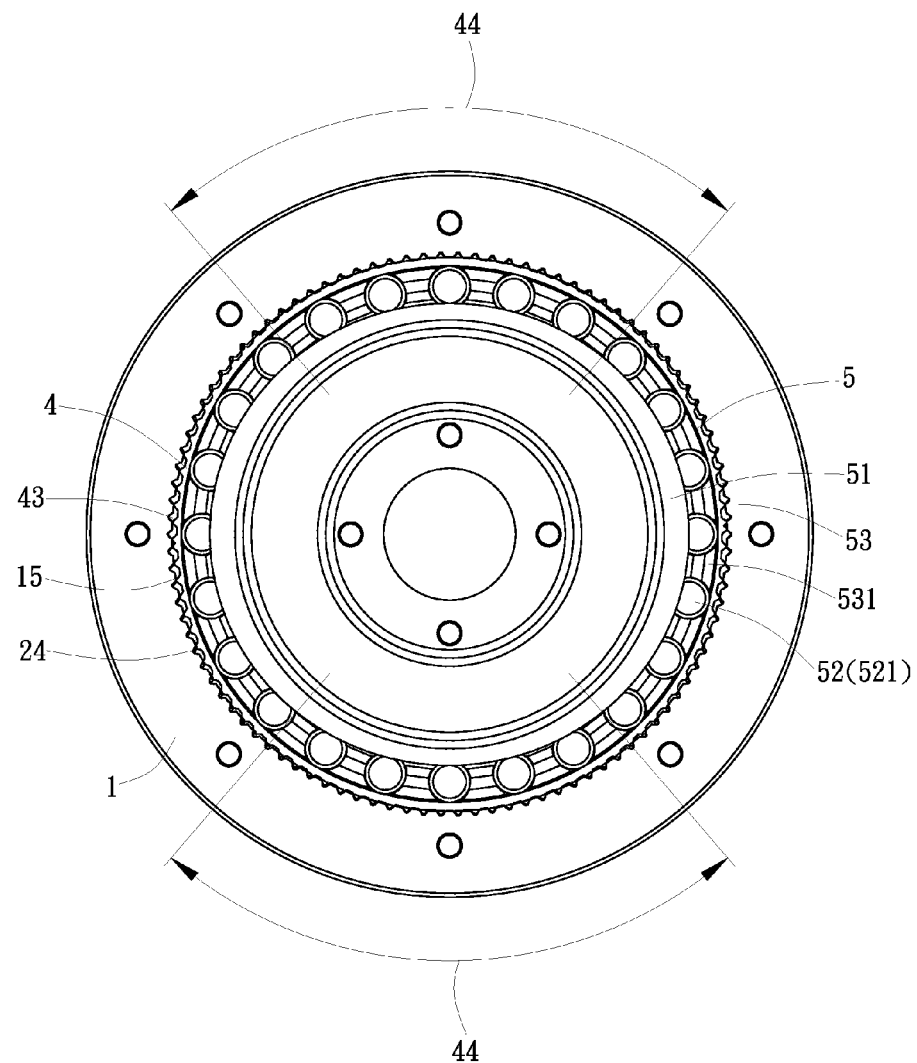
FIG. 5 is a schematic drawing illustrating the engagement status between the outer teeth 43 at two opposing segments of the inner race and the first and second inner teeth.

Referring to FIGS. 1, 2 and 4 again, the wave generator 5 preferably comprises a cam 51 and a plurality of second rolling elements 52. The cam 51 is a quasi-elliptical cam defining a major axis, a minor axis, and a peripheral cam wall 511. The second rolling elements 52 are preferably arranged in one or two rows around the cam wall 511 and stopped against the fourth inner race wall 42 of the inner race 4. Thus, during rotation of the cam 51, the second rolling elements 52 are forced to rotate synchronously, as shown in FIG. 5, forcing the outer teeth 43 at two opposing segments 44 of the inner race 4 into engagement with the first inner teeth 15 and the second inner teeth 24.

Figure 6:
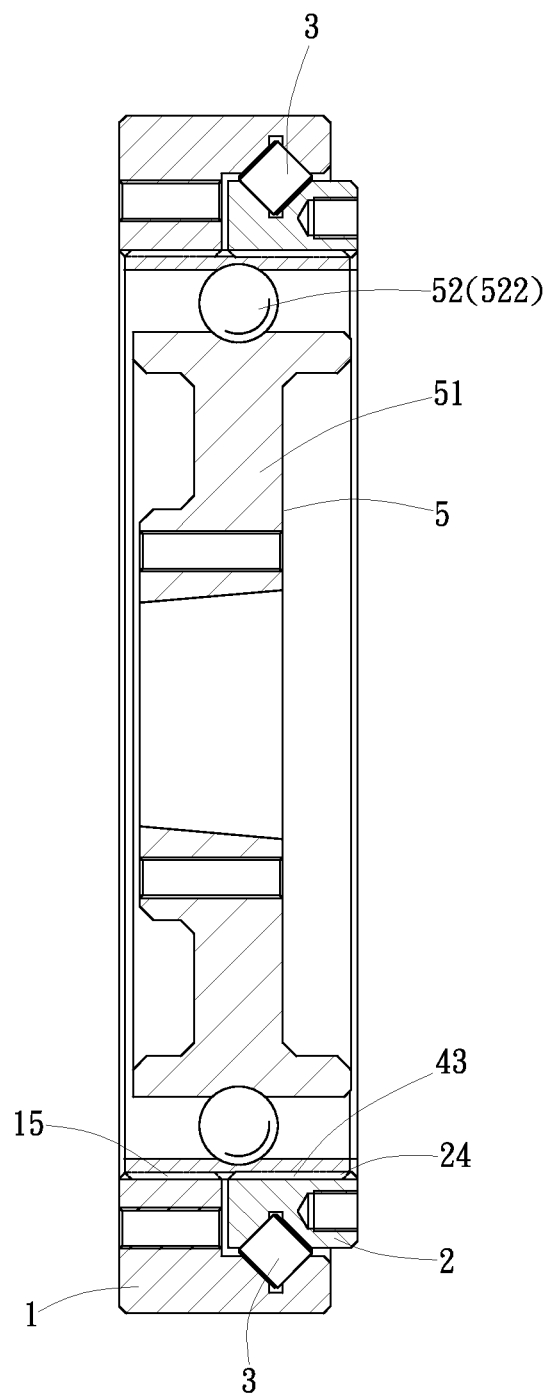
FIG. 6 corresponds to FIG. 4, illustrating an alternate form of first rolling elements installed.

Referring to FIGS. 1, 2 and 4 again, the wave generator 5 further comprises a retaining ring 53 having a plurality of positioning portions 531 at two opposite lateral sides thereof. The retaining ring 53 is mounted around the cam wall 511 of the cam 51, enabling the second rolling elements 52 to be respectively set between each two adjacent positioning portions 531 at each of the two opposite lateral sides of the retaining ring 53 and supported on the cam wall 511. Further, the second rolling elements 52 can be needle rollers 521 or rolling balls 522 (see FIG. 6).

Figure 7:
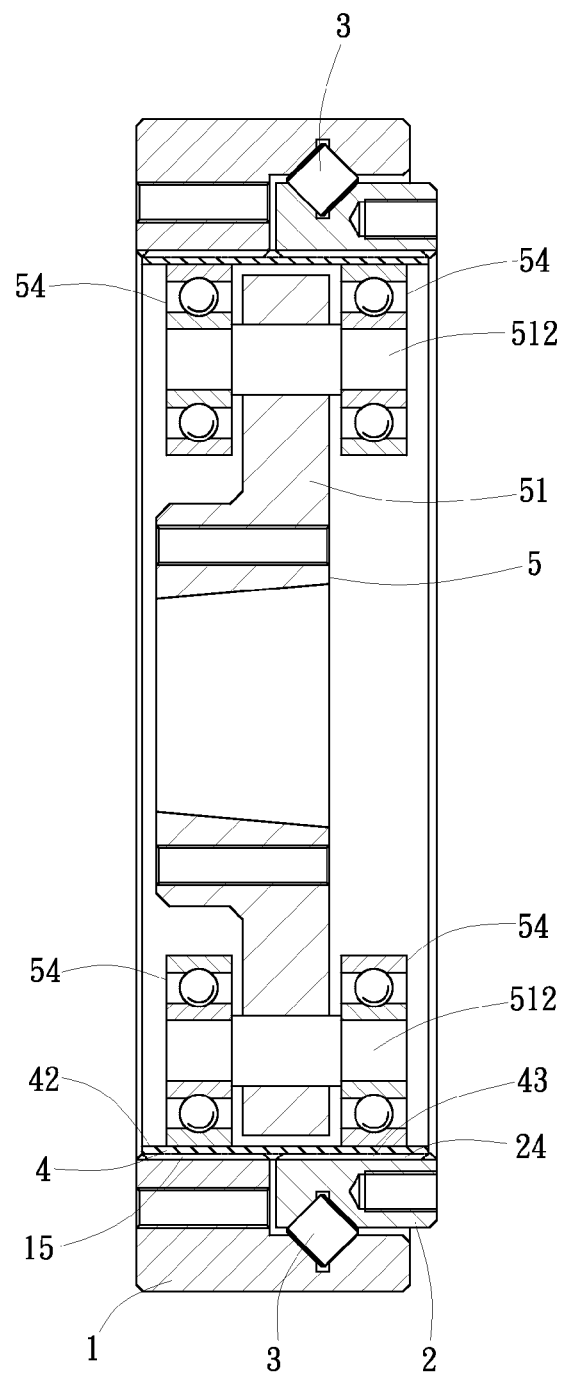
FIG. 7 is a schematic sectional view of the first embodiment of the present invention, illustrating an alternate form of wave generator installed.
Figure 8:
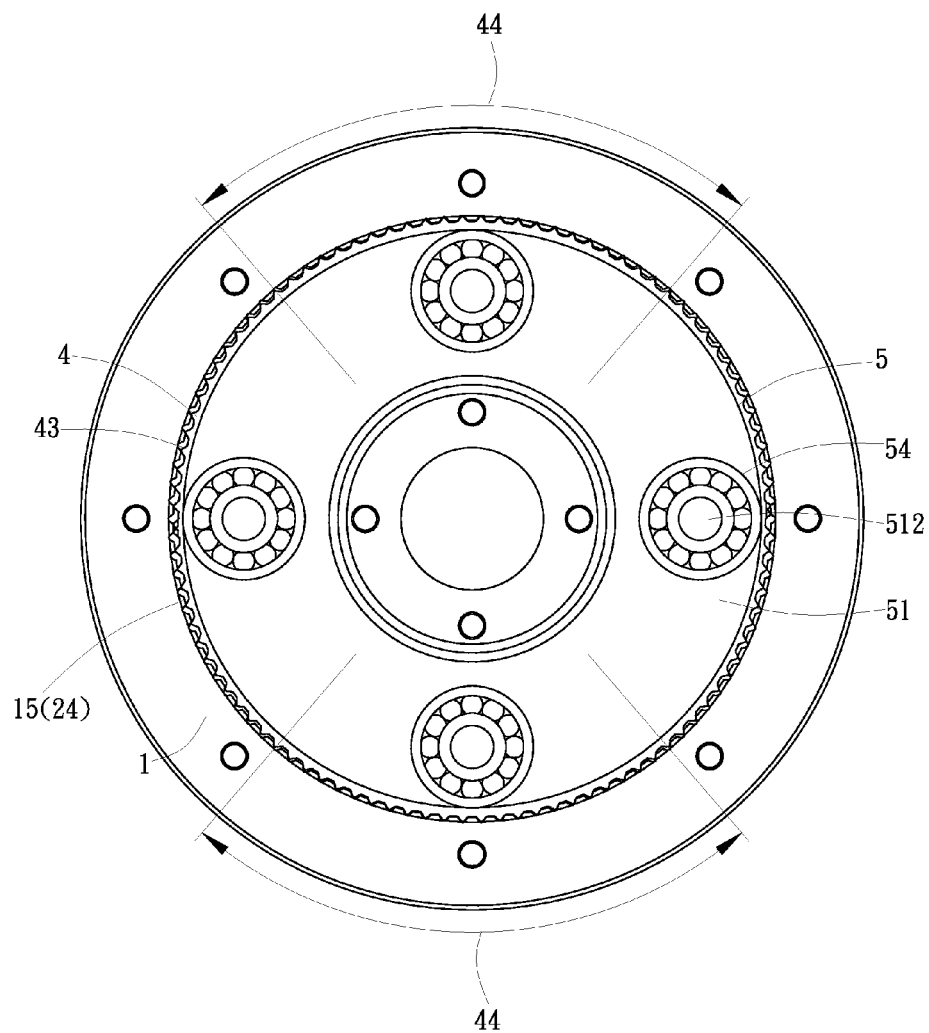
FIG. 8 is a schematic side elevational view of the first embodiment of the present invention, illustrating an alternate form of wave generator installed.

Referring to FIGS. 7 and 8, in the aforesaid first embodiment of the present invention, the wave generator 5 can be alternatively made, comprising a cam 51 and a plurality of third rolling elements 54, wherein the cam 51 is a quasi-elliptical cam with a major axis and a minor axis, comprising a plurality of axially extending pivot axles 512; the third rolling elements 54 are bearings 541, for example, ball bearings or needle roller bearings respectively mounted around the pivot axles 512 and stopped against the fourth inner race wall 42 of the inner race 4. Thus, this alternate form of wave generator 5 can achieve the same effects to force the outer teeth 43 at two opposing segments 44 of the inner race 4 into engagement with the first inner teeth 15 and the second inner teeth 24.

Figure 9:
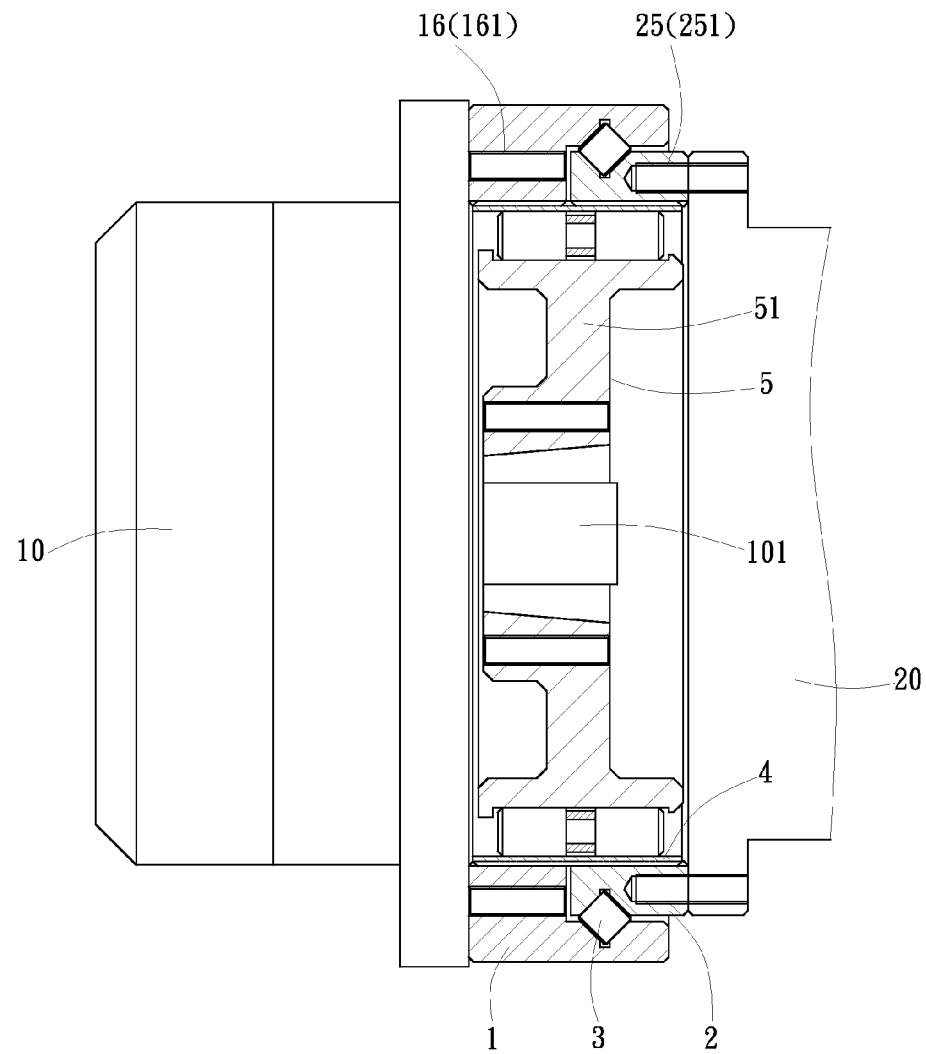
FIG. 9 is a schematic view of the application of the speed-reduction transmission bearing in accordance with the first embodiment of the present invention.
Figure 10:
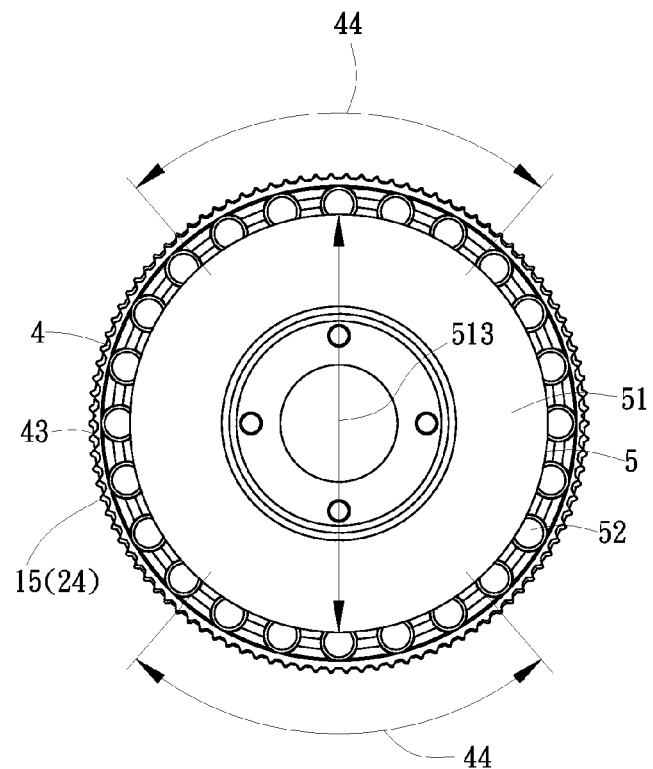
FIG. 10 is a schematic drawing illustrating a speed-reduction operation of the speed-reduction transmission bearing in accordance with the first embodiment of the present invention (I).
Figure 11:
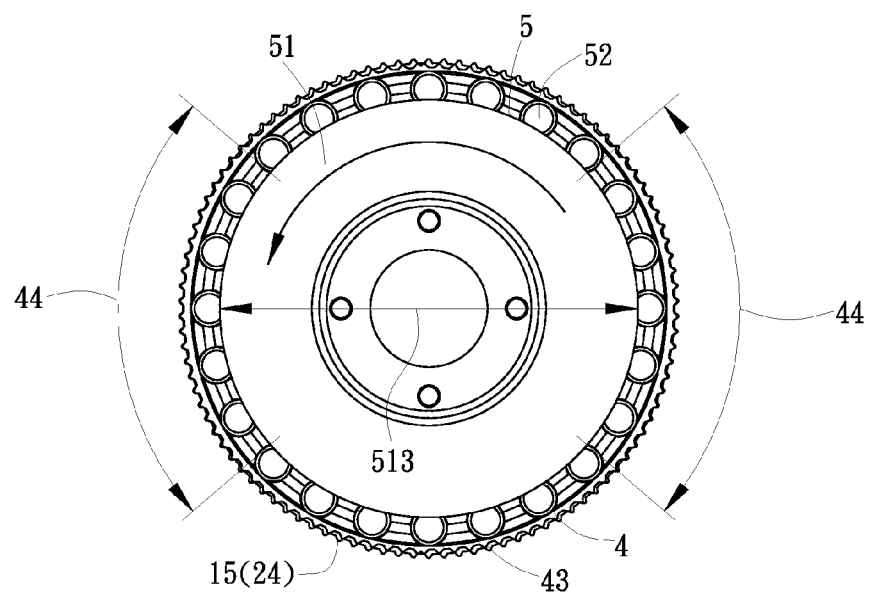
FIG. 11 is a schematic drawing illustrating a speed-reduction operation of the speed-reduction transmission bearing in accordance with the first embodiment of the present invention (II).

Referring to FIG. 9, during application of the present invention, the cam 51 of the wave generator 5 is coupled to a motor shaft 101 of a motor 10 and the screw holes 161 of the connection means 16 of the first outer race 1 are fastened to a flanged end part or any other locating member of the motor 10, enabling the first outer race 1 to work as an immovable fixed end. Thereafter, the screw holes 251 of the connection means 25 of the second outer race 2 are fastened to a transmission shaft 20 (output shaft) or other transmission device, enabling the second outer race 2 to work as a power-output rotating end. Referring also to FIGS. 10 and 11, when the cam 51 of the wave generator 5 is driven to rotate by the motor 10, the major axis 513 of the cam 51 keeps rotating and squeezing the inner race 4, continuously changing the locations of the two opposing segments 44 of the inner race 4 and reducing the revolving speed of the second outer race 2. Due to the tooth difference between the first inner teeth 15 and the second inner teeth 24, the second outer race 2 is rotated through one pitch per every single run of the rotation of the cam 51, achieving a high reduction ratio.

Figure 12:
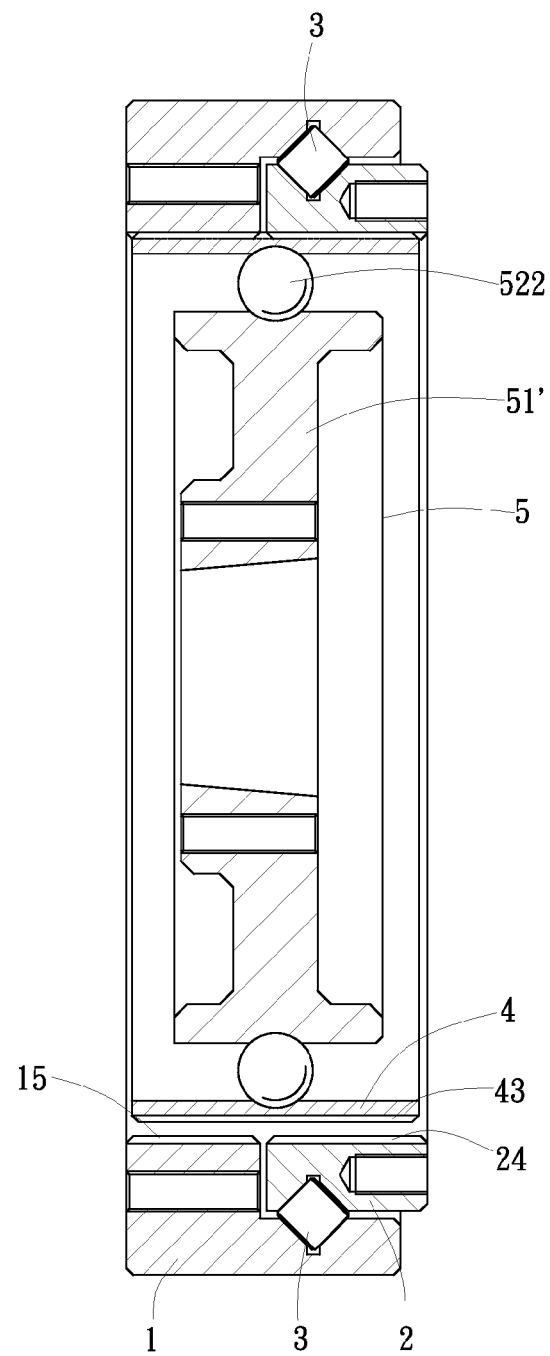
FIG. 12 is a schematic sectional view of a speed-reduction transmission bearing in accordance with a second embodiment of the present invention.
Figure 13:
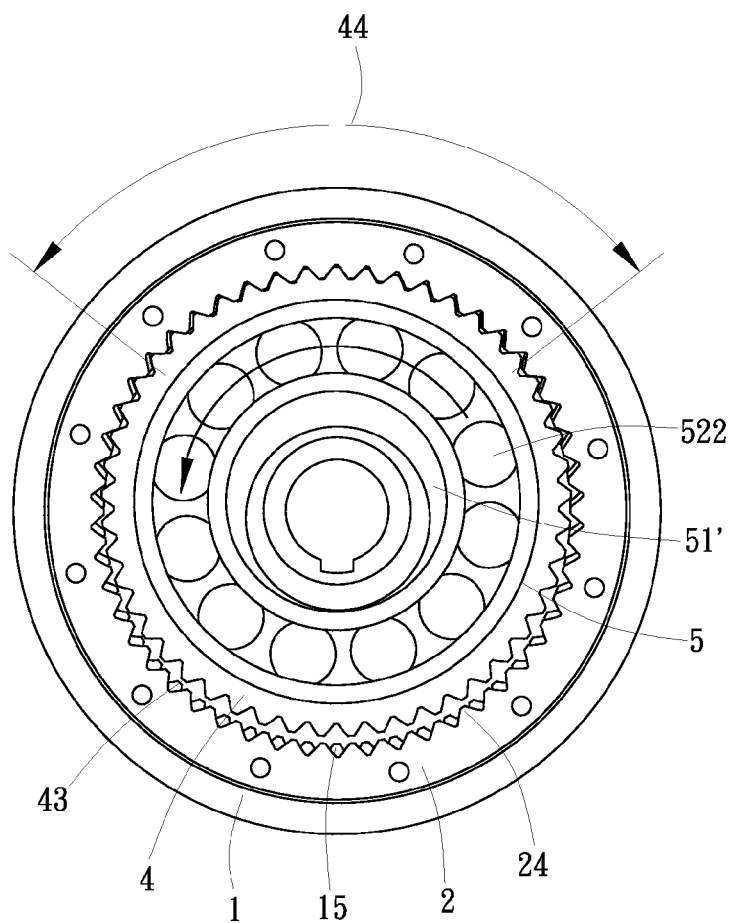
FIG. 13 is a schematic side view of the speed-reduction transmission bearing in accordance with the second embodiment of the present invention.

Referring to FIG. 12, a speed-reduction transmission bearing in accordance with a second embodiment of the present invention is shown. This second embodiment is substantially similar to the aforesaid first embodiment with the exception that the inner race 4 is a rigid metal ring rotatably mounted within the first outer race 1 and the second outer race 2; the wave generator 5 comprises a cam 51' and a plurality of third rolling elements 54, wherein the can 51' is an eccentric circular wheel; the third rolling elements 54 are rolling balls arranged between the cam wall of the cam 51' and the inner race 4. As illustrated in FIG. 13, during rotation of the cam 51' of the wave generator 5, the third rolling elements 54 are stopped against the inner race 4, forcing the outer teeth 43 at one segment 44 into engagement with the first inner teeth 15 and the second inner teeth 24. Thus, due to the tooth difference between the first inner teeth 15 and the second inner teeth 24, the second outer race 2 is rotated through one pitch per every single run of the rotation of the cam 51', achieving a high reduction ratio.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A speed-reduction transmission bearing, comprising:
   a first outer race comprising a first outer race wall, a first inner race wall, a second inner race wall, a first annular roller groove extending around said first inner race wall, and a plurality of first inner teeth located at said second inner race wall, the diameter of said first inner race wall being larger than the diameter of said second inner race wall;
   a second outer race rotatably mounted within said first inner race wall of said first outer race, said second outer race comprising a second outer race wall, a third inner race wall, a second annular roller groove located at said second outer race wall, and a plurality of second inner teeth located at said third inner race wall, said second inner teeth and said first inner teeth defining a tooth number difference;
   a plurality of first rolling elements arranged between said first annular roller groove of said first outer race and said second annular roller groove of said second outer race;
   an inner race rotatably mounted within said first outer race and said second outer race, said inner race comprising a third outer race wall, a fourth inner race wall and a plurality of outer teeth located at said third outer race wall; and
   a wave generator rotatably mounted within said inner race and supported on said fourth inner race wall of said inner race to force the outer teeth at at least one segment of said inner race into engagement with said first inner teeth and said second inner teeth, wherein
   said wave generator comprises a cam and a plurality of third rolling elements, said cam comprising a plurality of pivot axles at the periphery thereof, said third rolling elements being respectively mounted around said pivot axles and stopped against said fourth inner race wall of said inner race.

2. The speed-reduction transmission bearing as claimed in claim 1, wherein said inner race is an elastically deformable metal ring; said wave generator is configured to squeeze the outer teeth at two opposing segments of said inner race into engagement with said first inner teeth and said second inner teeth.

3. The speed-reduction transmission bearing as claimed in claim 1, wherein said inner race is a rigid metal ring; said wave generator is configured to squeeze the outer teeth of one segment of said inner race into engagement with said first inner teeth and said second inner teeth.

4. The speed-reduction transmission bearing as claimed in claim 1, wherein said first rolling elements are selected from the group of needle rollers and rolling balls.

5. The speed-reduction transmission bearing as claimed in claim 1, wherein said third rolling elements are axle bearings.

6. A speed-reduction transmission bearing, comprising:
a first outer race comprising a first outer race wall, a first inner race wall, a second inner race wall, a first annular roller groove extending around said first inner race wall, and a plurality of first inner teeth located at said second inner race wall, the diameter of said first inner race wall being larger than the diameter of said second inner race wall;
a second outer race rotatably mounted within said first inner race wall of said first outer race, said second outer race comprising a second outer race wall, a third inner race wall, a second annular roller groove located at said second outer race wall, and a plurality of second inner teeth located at said third inner race wall, said second inner teeth and said first inner teeth defining a tooth number difference;
a plurality of first rolling elements arranged between said first annular roller groove of said first outer race and said second annular roller groove of said second outer race;
an inner race rotatably mounted within said first outer race and said second outer race, said inner race comprising a third outer race wall, a fourth inner race wall and a plurality of outer teeth located at said third outer race wall; and
a wave generator rotatably mounted within said inner race and supported on said fourth inner race wall of said inner race to force the outer teeth at at least one segment of said inner race into engagement with said first inner teeth and said second inner teeth, wherein
said inner race is a rigid metal bracelet-like ring; said wave generator is configured to squeeze the outer teeth of one segment of said inner race into engagement with said first inner teeth and said second inner teeth.

7. The speed-reduction transmission bearing as claimed in claim 6, wherein said first rolling elements are selected from the group of needle rollers and rolling balls.

8. The speed-reduction transmission bearing as claimed in claim 6, wherein said wave generator comprises a cam and a plurality of second rolling elements, said cam comprising a peripheral cam wall, said second rolling elements being arranged on said cam wall and stopped against said fourth inner race wall of said inner race.

9. The speed-reduction transmission bearing as claimed in claim 8, wherein said wave generator further comprises a retaining ring mounted around said cam wall of said cam to hold said second rolling elements on said cam wall.

10. The speed-reduction transmission bearing as claimed in claim 9, wherein said second rolling elements are needle rollers or rolling balls.

* * * * *